United States Patent Office 3,715,111
Patented Feb. 6, 1973

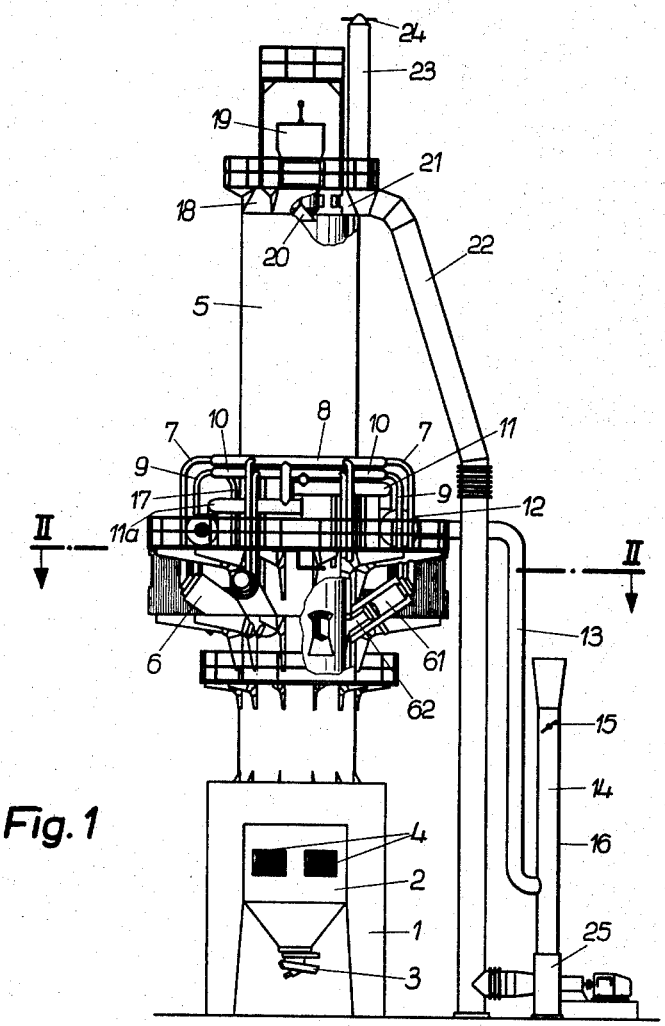
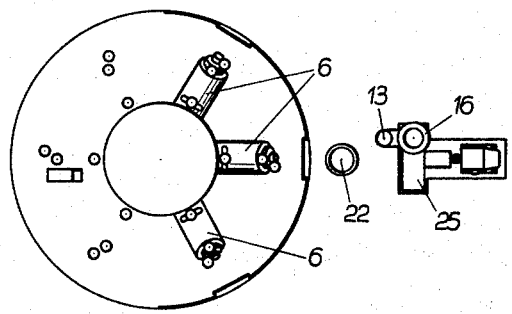
Fig.1
Fig.2

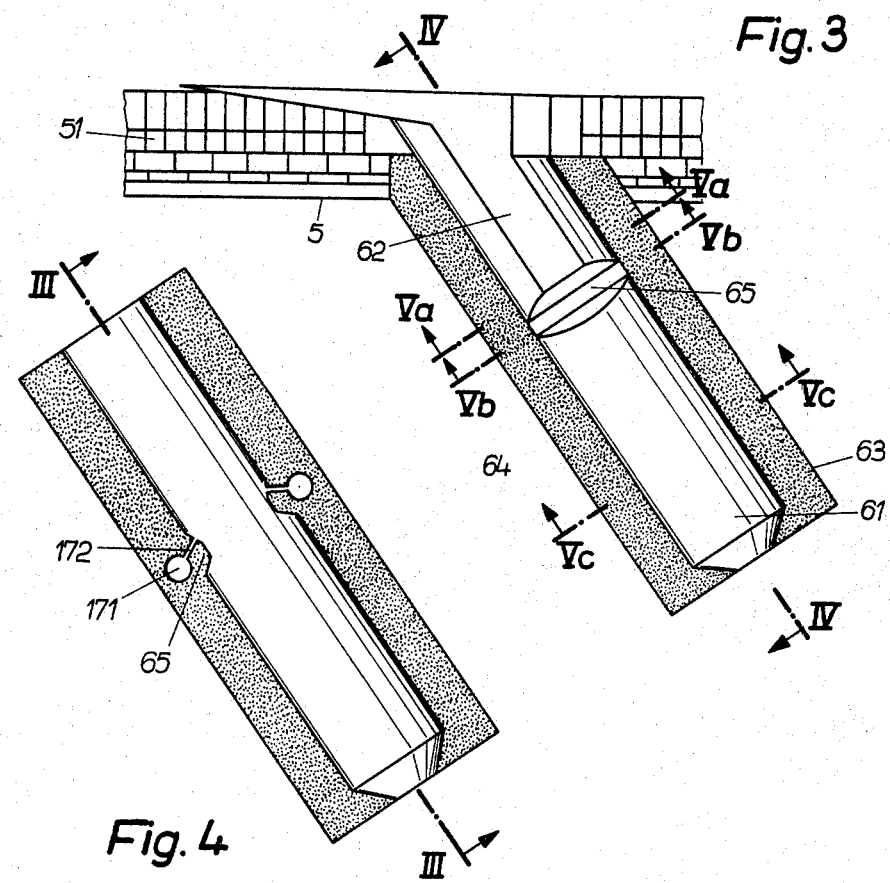
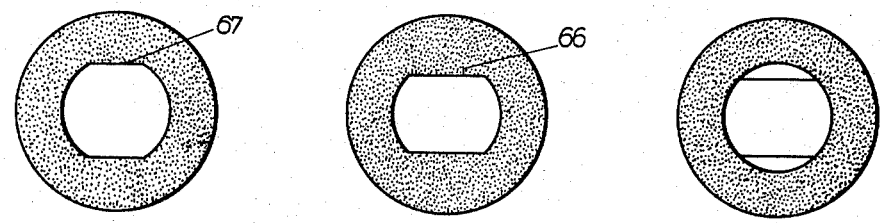

3,715,111
SHAFT LIME KILN
Felix Sobek, Friedrichstrasse 37, Dusseldorf, Germany
Filed Oct. 26, 1970, Ser. No. 84,107
Claims priority, application Germany, Mar. 9, 1970,
P 20 10 974.4
Int. Cl. C04b 1/00
U.S. Cl. 432—4
18 Claims

ABSTRACT OF THE DISCLOSURE

In a process for calcining and sintering granulated, crushed or shaped material in a completely enclosed kiln, a treated lean gas at very low pressure is used as the fuel. The progress of combustion for extending the firing zone is controlled by altering the calorific value of the lean gas. Further, the kiln atmosphere is controlled on the basis of separate and independent regulation of the pressure and volume of the waste gas generated in the combustion and in the de-oxidizing processes as well as by supplementary reactions during combustion.

The invention relates to a process for calcining and sintering of granulated, crushed or shaped material in a kiln fired by liquid or gaseous fuel, in a fully enclosed (except for the feed and discharge openings for the material and additives and waste gases) elongated kiln as well as a kiln plant for applying this process. Suitable processing materials will, for example, be carbonates like limestone, dolomite, magnesite, clay from which refractories can be produced, also fluxes suitable for sintering such as aluminum oxide, iron oxide, materials containing silicates, moreover synthetic material sutably treated for sintering by addition of the necessary fluxes—in any shape and form, as agglomerates of these substances irrespective of whether they were prepared by means of pelletizing, briquetting or other form of compression or treatment.

At the corresponding process temperatures, these materials are processed into, for example, calcined lime, caustically calcined and sintered magnesite, sintered dolomite, calcined clay as starting material for the refractories industry, clinker for the cement industry, reduced pellets from iron ore or other metallic ores, etc. To produce the required process temperatures natural gas, producer gas, liquid gas, heavy oil and light oil, gasoline and similar fuels are used. Depending on the type of fuel employed, the fuel inlets are designed as nozzles or burners.

It is known that combustion processes of this type are encountering severe difficulties through the intensive admixture of fuel gas and air causing local overheating in the area of the fuel inlet and having a very detrimental effect on the kiln lining; a further disadvantage encountered is the non-uniform progress of the calcining or sintering process. Consequently, it has been recommended that the fuel should be introduced by means of burners without or only with minute inclusion of air. However, this method has been found inadequate as regards obviating overheating locally at the kiln wall because the air brushing by from the cooling zone of the kiln meets the incoming fuel and so causes high local flame temperatures which lead to the rapid destruction of even the most high-grade linings in addition to burning up the material to be treated and thus rendering it unserviceable; at the same time, inadequate fuel supply locally prevents a satisfactory reaction so that the material remains unprocessed in part.

Further suggestions have been disclosed as to how these constantly recurring difficulties might be met which increase in direct proportion to the cross section of the kiln. To ensure uniform temperature diffusion, the burners or fuel feed lines have also been projected into the kiln area proper; these are, naturally, subjected to high mechanical and thermic wear of the kind which is known from experience to lead to rapid wearing out.

It was further attempted to sub-divide larger kilns by means of various incorporated assemblies, in particular with the aid of intermediate walls, and to provide the individual kiln chambers with individual fuel supply. But these measures were also unable to overcome the famliar difficulties because the access of air and the intense local flame and heat generation can neither be done away with nor controlled. Such incorporated assemblies, on the contrary, have led to additional troubles because their cooling systems were not effective enough locally and this, in turn, led to break-throughs and/or cave-ins. In order to better counteract this, it was thought expedient to incorporate into shaft kilns of this type a central ring-shaped internal assembly which gave the kiln area an annular shape formed by two concentric tubes; but this also could not essentially overcome the existing shortcomings with any better effect.

After these structural measures had failed to bring satisfactory relief, it was attempted to improve the process, for instance (DAS 1,086,165) to so dimension the incoming blow pressure of the non-combustible gases and the exhaust draught at the exhaust points for the cooling air as would achieve a pressure relationship which would keep the flame away from the kiln area wall and guide it towards the kiln axis. But also this process did not prove successful as regards achieving any essential improvement because the strong draw-off in the area of fuel feed made uniform combustion up to the centre of the kiln area difficult if not utterly impossible.

The invention bases on the discovery that, in particular in the case of combustion chambers having a large cross section, it is necessary to distribute the fuel through the cross section of the kiln area in such a manner as to prevent any appreciable concentration of fuel quantities in any particular spot so as to obviate the constantly present oxygen from the cooling air from entering into a strong reaction with the fuel and so to obviate also any large flame and heat generation. This important discovery, on which the invention is based, is thus applicable to all types of kiln and for all kinds of kiln operation, irrespective of whether the actual method of operation is by blast and positive pressure or suction and negative pressure (as the case may be). It was recognized that a uniform distribution of fuel of not too high calorific value over the cross section and over the entire volume of the combustion chamber must be created if a homogeneous reaction process avoiding local overheating is to be achieved on the basis of uniform heat generation and uniform heat diffusion. Over and above this, it is necessary to remove the waste gases generated during the reaction in such a manner that the pressure and draught conditions in the kiln area shall be conductive to the uniform distribution of fuel and the uniform progress of the reaction.

Based on these discoveries, the process according to the invention now is that the fuel to be fed under very low pressure shall be a suitably treated lean gas and that the kiln atmosphere shall be controlled on the basis of presure and waste gas measuremets by means of separate and independent regulation of the pressure and the volume of the waste gas generated in the combustion and in the de-oxidizing processes as well as by the supplementary reactions during combustion.

It has obviously not been previously discovered that the strong local reactions which experts have established between the fuel gas feed with the oxygen in the air, in particular in the zone of the combustion chamber walls and/or the feed points for the fuel must be preponderantly the result of the high calorific value of the fuel gas employed; in fact, far from recognizing the cause, the endeavour was to feed preferably rich fuel of high calorific value to the kiln area so as to induce favourable performance data. According to the underlying principle of the invention, exactly the contrary measure is the correct one, namely that of using very lean fuel gases with calorific values roughly between 750 kcal./Nm.$^3$ and 1200 kcal./Nm.$^3$ at the maximum. According to the principle of the invention, the available gaseous or liquid fuels must be treated or cut down to these calorific values before they are allowed to enter the combustion chamber. This is done by means of admixing the available fuel of suitable calorific value to an available neutral or inert carrier gas in the corresponding dosage and with preferably homogenic distribution. Another fundamental of the invention is that and how the typical kiln pressures and waste gas volumes characteristic to the process are measured or otherwise established; and, on the basis of these values, the waste gases resulting from the calcining and de-oxidizing processes as well as the additional waste gases resulting from combustion are extracted under separate and independent regulation of pressures and volumes. By means of so controlling the waste gas flow, it becomes feasible to create and maintain such an atmosphere within the kiln as ensures the uniform permeation of the combustion area cross section by the fuel evenly admixed to the carrier gas so as to also result in the calcining process taking place homogeneously throughout the combustion area. This process positively prevents the local overheating encountered where highly combustible fuel quantities concentrate because it eliminates the possibility for the formation of such concentration.

The process according to the invention also affords a simple possibility to retain all its advantages whilst adapting the combustion process and so the kiln atmosphere to the stock to be treated in each case and so to ensure the faultless carrying out of any desired process. There is no difficulty in controlling the temperature and the intensity of combustion, the progress of the combustion process, in the sense of extending the firing zone, i.e. a retarding of the calcining process and hence a prolongation of the time during which the material remains within the reaction zone; what is needed for this purpose is an alternation in the calorific value of the lean gas feed by means of a further cutting down. Of course, the reverse also creates no difficulty, namely an acceleration of the combustion process by means of suitably enriching the fuel gas. However, since most relevant processes are based on the endeavour to keep the process going as long as possible so as to allow the material to remain in the kiln for an optimum period, the first-mentioned feasible control function according to the supplementary invention is of essential significance.

In the case of several types of materials to be de-oxidized, in particular in the case of a high throughput stipulation with the consequently shortened duration of stay in the kiln, especially when dealing with coarse granulates, considerable difficulties are encountered in achieving an adequate residual de-oxidizing. In part, endeavours were made to intensify the process by means of working with greater or lesser superpressures. Against this, according to the invention, it is proposed to maintain in the kiln in such cases an atmosphere of slightly negative pressure conducive to residual neutralization.

Many calcining and sintering processes call for the use of kiln plant in which the waste gas of the zone of incandescence is fed back to the kiln area as return gas either for the purpose of again utilizing the still combustible substances following transformation (Boudouardic Reaction) or for the purpose of again utilizing the non-combustible substances as coolant or sealing gas. The further invention relates to such a kiln plant and has as its object a process under which the waste gas of the kiln serves as carrier gas for carburized foreign gases and is returned to the kiln as fuel. By means of a corresponding slight enrichment of the return gas with the available fuel gas of generally very high thermal content, the necessary lean gas is produced; this method makes it possible to run the kiln in an economic and advantageous manner of operation.

According to the further invention, by means of variation of the degree of carburating and/or of the volume and/or of the pressure of the fuel gas before entry into the combustion chamber, by means of independently actuated and set control elements, on the basis of the values established in the kiln atmosphere, the calorific value of the lean gas and, consequently, the process rate, can be regulated.

Thus, for influencing the substances to be fed to the kiln, three separate and independently controlled regulating and setting possibilities are available for creating optimum process conditions for every calcining and sintering process for the material to be handled. The process is universal in its scope of application because, according to the invention, foreign gases for carburating the return gases can be natural gases of every type, combustible waste gases, such as, for instance, top gas, synthetic gas, wood gas, coking gas, liquid gas like propane, butane, gasoline and cracked gases which are the by-products of reductive combustion.

If, according to the invention, light or heavy oil is used as fuel, then it is necessary also, like in the case of the application of gaseous fuels, to have the possibility of regulating the fuel feed to the kiln by degree of carburation as well as by pressure and by volume. To achieve this regulation, the flow of substances before the cracking process—with the exception of the oil feed to be regulated according to volume only—must be independently regulated as to pressure and volume. Thus the process provided for under the invention is that a cracking gas shall be used to carburate the carrier gas and that such cracking gas shall be produced in a combustion chamber under substoichiometric process and controlled feed of air for the primary combustion of the oil and using independent control elements for regulating volume and pressure. In some neutralizing processes ahead of a number of sintering processes, the temperature is relatively high. For example, the sintering temperature for some dolomites is in the region of 1400 to 1500° C. whilst the temperature in the previous neutralization is in the region of approx. 1000 to 1200° C. These slight differences in the process temperatures between the sinter process and the previous process prevent the waste gases from the sintering process taking place deeper in the kiln from still having a sufficiently high temperature to make them suitable to carry out neutralization. Hitherto, consequently, the endeavour has been to add the missing process heat above the sintering zone and, for this purpose, one or more additional incandescent levels were added by the means of adding further nozzles to bring in more gas or further burners above the sintering zone; in part, direct injection of liquid fuel into this area was also carried out.

But these measures were not successful in overcoming the shortcomings described in the foregoing because, even if extra nozzles and/or burners are used according to the known process, there is an inadequate distribution of the fuel in the incandescent area and, consequently no uniform filling the cross section and the shaft volume with a homogeneous fuel gas. In the area of the feed points of the fuel, in particular also where fuel is directly injected, inadmissibly high temperature rises have been encountered locally and have led to poor quality if not unserviceable products. Against that, the process under the invention offers very considerable advantages also if two or more incandescent levels are used because the precise control of the kiln atmosphere by means of the invention process characteristic regulation system is effective also beyond the main combustion chamber in such a manner as to ensure the smooth coordination of temperatures between the various incandescent levels with complete mastery of conditions. Thus the further process according to the invention is that of creating and maintaining in two or more reaction zones process conditions with different characteristics by means of feeding the fuel gas in several levels in various degrees of carburation of the lean gas and with the corresponding settings for pressure and/or volume of the fuel gas fed to the various incandescent zones as well as by means of the corresponding individual and independent regulation of pressure and volume of the extracted waste gases.

The process methods under the invention thus have their core in the basic principle of using pressure and waste gas volume measurements to maintain a fully controlled kiln atmosphere adapted to suit the process data in each case and to maintain the same so that, unlike the conventional, the necessary supply of warmth can be introduced and uniformly spread into a large quantity of carrier gas which is introduced into the incandescent zones so that these are very essentially enlarged whilst the flow in the same is considerably retarded. This results in a considerable extension of the treatment time and results, for example, also in the production of essentially better-quality calcined or sintered materials.

These process methods, retaining their advantages, are also applicable if and when the material to be treated has had solid fuel added in the interest of creating the process temperature and of carrying out the reaction. Depending on the distribution of the solid fuel or fuel proportions, favourable combustion conditions result which satisfy the foregoing pre-requisites of the process according to the invention irrespective of whether or not, in addition to solid fuels, further gaseous fuel is added and irrespective of whether the kiln works with negative or positive pressures.

Acting on the basis of these discoveries, the further process according to the invention is that, when carrying out the reaction by means of combustion of solid fuels added to the material and, if applicable, simultaneous intake of gaseous fuels and keeping a slight sub-pressure in the combustion chamber, the kiln atmosphere can be controlled on the basis of pressure and waste gas volume measurements by means of individual and independent regulation of pressure and volume when extracting the waste gases arising during combustion and neutralization as well as from the additional reactions during combustion. This process can further be adapted so that, if a certain over-pressure is maintained in the combustion chamber, the atmosphere in the kiln is controlled on the basis of pressure and waste gas measurements by means of separate and independent regulation of pressure and volume of the intake of cooling and combustion air.

The processes according to the invention are applicable to several types of kiln plant. Whilst shaft-type kilns for many treatment processes are the preferred range, the invention only includes but is by no means limited to kilns of this type. On the contrary, it is applicable in all cases where the kiln plant encounters the problems discussed herein and in particular in all cases where the creation of an extensively homogenic kiln atmosphere and the ready controllability of the process progress is decisive, such as, for instance, with the technologically comparable furnace plants like tunnel-type furnaces, travelling grate furnaces, rotating hearth furnaces and similar hearth furnaces or chamber furnaces in which the material to be treated practically fills the cross section.

In plant of this type, featuring waste gas extraction openings followed by exhausters and equipped with return gas lines, the further invention is that the waste gases are taken through lines into a chimney which incorporates an adjustable retaining flap below which the waste gas volume required for carrier gas is extracted in a gas return line and fed back to the incandescent area after carburetion. This creates within a portion of the chimney a holding area of adjustable overpressure from which the waste gas required as carrier gas can be extracted; the waste gas is taken in a return gas line to the carburetion facility from where it flows in controlled volume and under controlled pressure as fuel gas to the combustion area. A characteristic of the invention is that, for the purposes of controlling the pressure and volume of the waste gas and additives substance flows, the lines handling these flows feature throttling facilities which can be independently actuated. Instead of throttling facilities, independent control of positive or negative pressure and volume of the waste gas and additive flow can be achieved by means of incorporating fans or exhausters into the lines carrying such flow(s) of which the throughput and pressure application can be controlled by means of speed regulators, adjustable vanes or similar adjustable regulating devices.

A special task set in using such plant in accordance with the invention process is that of achieving an expedient leading of the lines in such a manner that the fuel gas and additives to be taken into and the waste gases to be extracted from the furnace portion are favourably introduced and/or removed so as to make sure that the feed and return lines are uniformly loaded by the gases which are under very low pressure and flowing very slowly. The success of the application of the process according to the invention also depends on being able to take the gas and additions flow under constant pressure and at uniform speed into and out of the relevant area. For this purpose, the invention provides for the ring mains to which the feed lines for return gas and/or combustion gas and/or the primary air for the combustion chamber are connected are, in turn, connected by means of two semi-annular lines featuring opposite lead-ins to the kiln area and/or the supply ducts respectively. This design and arrangement ensures that, independently of the number and position of the feed and return lines to or from the furnace area, the ring mains are uniformly loaded and uniformly load the lines leading off from the same (for example, to the burners or gas nozzles).

With furnace plant of this type, it has been found expedient in part to arrange the combustion chambers for the production of cracked gas from fuel oils at the circumference of the combustion chamber and set off at an angle towards the bottom. This arrangement affords the advantage that the material to be treated has no access to the combustion chamber and that the combustion chamber itself is easier to clean from the residues which fall of their own accord into the furnace part when the chamber is cleaned. On the basis of this familiar design and arrangement method, the further invention is that a blending chamber follows the combustion chamber wherein the carrier gas is introduced and carburetized with the cracked gas produced. The return gas line for the carrier gas leads into this blending or mixing chamber and the carburetizing of the waste gas there products the lean gas required as fuel gas.

A further characteristic feature of the invention also is the special design of the transition area between combustion and blending chamber, namely, according to the invention, this area features a narrowing of the clear cross section at parts of the circumference but the narrowing is restricted to the lateral surface portions; this leaves the transition zone between the combustion and the blending chamber on an even level at the lower wall portion and this results in the benefit that the cleaning of the burners is greatly facilitated because residue can simply be pushed with the aid of a slide or a scraper from the lower even wall portion downwards into the combustion area.

An additional characteristic feature of the invention relates to the design of the blending chamber. According to the invention, this chamber has a somewhat smaller clear cross section than the combustion chamber, the smaller dimensions resulting in particular from constrictions and smoothing of the lateral wall portions of the chamber. The decrease in the cross section of the mixing chamber as compared with the combustion chamber is responsible for creating higher flow turbulences and so ensuring a more intensive and extensive blending of the fuel gas and the carrier gas. The shape of reducing the cross section area by means of constrictive smoothings yields similar benefits to those achieved in the design of the combustion chambers, namely they are easier to keep clean.

The invention also comprises a process for the starting of a gas and/or oil-fired kiln/furnace plant; it consists of using special pilot burners in conjunction with the fuel gas feed nozzles to produce a mixture of gas and air directed at the charging end and fired by hand with the aid of a slow match and that the air proportion of the pilot burner gradually decreases corresponding to the progress of heating up of the material to be treated and, when the latter has reached an adequate temperature, is shut off completely whilst the combustion air from the combustion portion of the furnace is gradually drawn upon in increasing quantities and that, in the course of the steadily increasing proportion of material warming up to operating temperature, the pilot burners are cut out and the normal fuel gas feed is cut in. By this means it is possible to start up a gas-fired furnace of this type without having to call upon additional extraneous combustible material.

The invention is further elucidated with the aid of drawings representing the corresponding kiln plant. The illustrations show the following:

FIG. 1 front and sectional views of a shaft kiln which is equipped with the apparatus according to the invention for carrying out the process according to the invention;

FIG. 2 horizontal sections II—II of the shaft kiln according to FIG. 1;

FIG. 3 longitudinal section (III—III to FIG. 4) with a calcining unit according to the invention, consisting of the combustion chamber and the blending/mixing chamber;

FIG. 4 the same calcining unit according to FIG. 3 in a different longitudinal section (IV—IV to FIG. 3);

FIGS. 5a, 5b, 5c cross sections of the calcining unit according to FIG. 3 (Va—Va, Vb—Vb, Vc—Vc).

The shaft kiln represented in FIG. 1 is arranged on a base 1 which also incorporates the collecting bin 2. In this collecting bin, the continuously produced treated material collects and is removed by means of bin discharge facility 3 at the bottom end. The collecting bin 2 is further equipped with air inlet openings which feature adjustable shutters; these serve to regulate the speed of the air flow into the combustion chamber.

The kiln shaft proper 5 is equipped with a series of burner units 6 arranged on the circumference and pointing towards the shaft centre as also shown in FIG. 2. Each burner unit 6 consists of a combustion chamber 61 and a blending chamber 62. Details of the arrangement of the burner facilities 6 can be seen from FIGS. 3, 4 and 5a through 5c.

In the combustion chambers 61 the primary partial combustion of the fuel oil takes place. The combustion chambers 61 receive the necessary primary combustion air through the lines 7 which are connected to a ring line 8; this is fed from atmospheric air by means of a blower. A scouring gas cools the combustion chambers 61 through lines 9, the scouring gas being taken from ring line 10. This ring line 10 receives the scouring gas from the blower 12 through the half ring line 11. The blower 12 sucks this scouring gas through return gas line 13 from the holding space 14 formed in chimney 16 below retaining flap 15.

Into the mixing chambers 62 the carrier gas is piped which is also taken from the ring line 10 and introduced through lines 17 into the individual blending chambers 62 for the purpose of producing the fuel gas.

At the top 18 of the shaft kiln 5 the charging lock chamber 19 with the lowering cone 20 is arranged. The top also features a ring-shaped waste gas exhaust duct 21 which has inlets for the exhaust gas. The waste gas downcomer 22 is connected to the ring-shaped waste gas exhaust duct 21 and at the top-most point an emergency chimney 23 with an explosion door 24 is arranged. A waste gas exhauster 25 serves to extract the waste gas into the waste gas downcomers 22 and to push the sucked-in waste gases out through the chimney 16 into the open.

FIG. 3, shorn of those parts which are not necessary for the appreciation of this particular item, shows the burner unit 6 and the arrangement of the burner units 6 at the shaft kiln wall. As previously mentioned, the burner unit is arranged at a downward angle and leads through the kiln lining 51 into the kiln area. The combustion chamber 61, into which the non-represented lines for scouring gas and primary air and also for fuel oil lead, is located in a cylindrical steel shell 63 and features a lining 64 of tamping compound. To the combustion chamber 61, divided by the constriction 65, is adjoined the mixer chamber 62 leading to the kiln area. To introduce the carrier gas into the mixing chamber 62, use is made of the half ring line 171 which partially surrounds the mixing chamber and from which a number of feed nozzles 172 lead into the mixing chamber. The half ring line 171 is connected to the carrier gas feed line (FIGS. 1, 17) which is not shown in detail.

The constriction 65 between the mixing chamber 62 and the combustion chamber 61 is shaped in the cross section as lateral smoothing planes 66 as is evident from FIG. 5b (Section E—E), whilst FIG. 5a (Section C—C) gives a plan view of the constriction zone 66. In the area of the mixing chamber 62 smaller flattenings 67 are provided for which achieve by the simplest means a reduction in the cross section and so in the volume; this increases the turbulence and so enhances the blending intensity.

Production of the combustion gas for carburetizing the carrier gas is effected by sub-stoichiometric combustion of the fuel oil feed in the combustion/burner chambers 61; caburetizing is carried out in the adjoining mixing chambers 62 into which the fuel oil is introduced after its primary partial combustion. It is necessary to keep the temperature at the walls of the combustion chambers constant within tight limits so as to prevent destruction of these chambers. This purpose is served by the combustion chambers 61 being cooled in a manner not shown in detail by the scouring gas available in lines 9.

Regulating the kiln atmosphere requires precise control of the volumes and pressures, suitable for the process conditions, of the combustion gases introduced into the combustion chamber and of the waste gases extracted from or to be extracted from the same. In our practical example representation, these waste gases are extracted through waste gas exhauster 25 controlled in dependence upon pressure and volume by means of rotational speed and throttling controls. In this way, corresponding to the individual specific requirements of the treatment process in each case, a greater or lesser degree of sub-pressure can be maintained in a so operated induced draught shaft kiln and it is also feasible to admit the cooling and combustion air dosed according to pressure and volume through the shutters of the air inlets 4 into the kiln area. The combustion air, pre-warmed by the material being processed, emerging from the cooling zone in the bottom portion of the shaft kiln blends itself with the combustion gas incoming from the burner units 6. The resultant air-gas mixture is fired by the glowing material being processed and burns on its way to the kiln top; in so doing, it generates the reaction temperature.

I claim:

1. Process for calcining and sintering granulated crushed and shaped materials comprising the steps of forming a completely enclosed vertically elongated kiln providing a vertically extending shaft for the processing of the material, introducing the material to be processed at the upper end of the shaft and removing the processed material from the lower end of the shaft, wherein the improvement comprises the steps of mixing fuel and air in a combustion space separate from the kiln shaft, effecting a partial combustion of the mixed air and fuel in the combustion space, introducing the fuel and air which has undergone partial combustion into a mixing space separate from the kiln shaft, adding a carrier gas into the mixing space and mixing the carrier gas with the mixed air and fuel from the combustion space for providing a lean fuel gas at very low pressure, introducing the fuel gas from the mixing space into the kiln shaft at a location intermediate its upper and lower ends for use as fuel within the kiln shaft, and regulating the atmosphere within the kiln shaft by separate and independent regulation of the pressure and volume of the waste gases generated within and extracted from the kiln shaft.

2. Process, as set forth in claim 1, characterized therein by regulating the calorific value of the lean fuel gas introduced into the kiln shaft between the values of 750 kcal./Nm.$^3$ and 1200 kcal./Nm$^3$ for controlling the progress of combustion of the fuel gas within the kiln shaft for extending the fuel zone and affording a longer dwell time for the fuel gases within the kiln shaft.

3. Process, as set forth in claim 1, characterized therein by establishing an atmosphere in the shaft kiln for separating carbon dioxide and maintaining a residual neutralization at a slightly negative pressure.

4. Process, as set forth in claim 1, characterized therein by using waste gas from the kiln shaft as the carrier gas mixed in the mixing space with the air and the fuel from the combustion space.

5. Process, as set forth in claim 4, characterized therein by measuring the values of the atmosphere within the shaft kiln and regulating the calorific value of the fuel gas introduced into the kiln shaft in accordance with the measured values within the kiln shaft by altering at least one of the carburetization, volume and pressure of the fuel gas.

6. Process, as set forth in claim 5, characterized therein that the gas introduced into the mixing space is selected from one of the gases consisting of natural gases, combustible waste gases, synthetic gases, coke oven gas, fluid gas, butane, gasoline and cracked gases yielded by the reductive combustion of light and heavy oils.

7. Process, as set forth in claim 6, characterized therein that the fuel introduced into the combustion space is selected from one of the group consisting of light oil and heavy oil and generating a cracked gas in a sub-stoichiometric process in the combustion space and flowing the cracked gas into the mixing space.

8. Process, as set forth in claim 1, characterized therein by adding the fuel gases at separate levels in the kiln shaft and providing at least two reaction zones therein, maintaining different conditions within the reaction zones by varying the degree of carburetization of the carrier gas and fuel gas within the mixing space.

9. Process, as set forth in claim 1, characterized therein by adding solid fuel into the material to be processed, maintaining a slightly negative pressure within the combustion zone in the kiln shaft and regulating the pressure and volume of waste gases extracted from the kiln shaft.

10. Process, as set forth in claim 1, characterized therein by adding solid fuel into the material to be processed, maintaining a certain positive pressure within the combustion zone in the kiln shaft based on waste gas pressure and volume measurements, and regulating the extraction of the waste gas from the kiln shaft.

11. Process, as set forth in claim 1, characterized therein by the steps of directing a start-up mixture of fuel gas and air inwardly into the kiln shaft, initiating the combustion of the start-up mixture by igniting the fuel gas manually, reducing the proportion of air in the start-up mixture as the material to be treated becomes heated by the combustion of the start-up mixture and cutting off the air into the start-up mixture when the materials to be processed are heated to a desired temperature and at the same time drawing air gradually in increasing proportion from the combustion zone in the kiln shaft and when the temperature of the material to be processed has reached the operating temperature discontinuing the supply of the start-up mixture and supplying fuel gas to the combustion zone in the shaft kiln from the mixing space.

12. Kiln plant for calcining and sintering granulated crushed and shaped materials comprising a vertically elongated closed kiln shaft, at least one fuel burner unit connected to said shaft kiln intermediate its upper and lower ends and forming a mixing chamber communicating with the interior of said shaft and a combustion chamber communicating with said mixing chamber and spaced from said kiln shaft, said kiln shaft having a material charge lock at its upper end and a processed material collecting bin at its lower end, an exhaust gas duct connected to the upper end of said shaft kiln, a vertically arranged chimney connected to the opposite end of said exhaust duct from said kiln shaft, an adjustable retaining flap located within said chimney spaced intermediate its upper and lower ends, a gas return line connected at one end to said chimney below said adjustable retaining flap and at its other end to said burner unit for returning waste gases from said kiln shaft to the mixing chamber within said burner unit.

13. Kiln plant, as set forth in claim 12, wherein throttling means are associated with said exhaust duct and said gas return line for regulating the pressure and volume of the waste gases used in processing the material within said kiln shaft.

14. Kiln plant, as set forth in claim 12, wherein a blower is associated with said exhaust duct and a waste gas exhauster is associated with said chimney for adjustably varying the amount and pressure of the waste gases removed from and returned to said kiln shaft.

15. Kiln plant, as set forth in claim 12, wherein a first ring line is connected to said combustion chamber in said burner unit for supplying primary combustion air therein, a second ring line for supplying scouring gas into said combustion chamber in said burner unit, a half-ring line connected to said blower for supplying waste gas for use as scouring gas in said combustion chamber.

16. Kiln plant, as set forth in claim 12, wherein each said burner unit has an elongated axis with the axis extending in the downward direction into said kiln shaft and with said mixing chamber and combustion chamber arranged on the axis of said burner unit with the mixing chamber adjacent said kiln shaft and said combustion chamber spaced outwardly from said kiln shaft by said mixing chamber.

17. Kiln plant, as set forth in claim 16, wherein each said burner unit has a wall constriction extending transversely of its axis and defining the adjacent ends of said mixing chamber and said combustion chamber.

18. Kiln plant, as set forth in claim 17, wherein said mixing chamber has a smaller cross section extending transversely of the axis of said burner unit than the corresponding cross section of said combustion chamber, and the surface of said mixing chamber is defined by two curvilinear sides and two rectilinear sides.

References Cited

UNITED STATES PATENTS 3,544,093  12/1970  Fisher et al. _____ 263—53 R
3,142,480  7/1964   Azbe _____ 263—29

CHARLES J. MYHRE, Primary Examiner

U.S. Cl. X.R.

432—17, 21, 23, 99, 101